US008988728B2

(12) United States Patent
Nakase

(10) Patent No.: US 8,988,728 B2

(45) Date of Patent: Mar. 24, 2015

(54) CALIBRATION METHOD EXECUTED IN IMAGE FORMING APPARATUS

(75) Inventor: Takahiro Nakase, Moriya (JP)

(73) Assignee: Canon Kabushiki Kaisha (JP)

( * ) Notice: Subject to any disclaimer, the term of this patent is extended or adjusted under 35 U.S.C. 154(b) by 341 days.

(21) Appl. No.: 12/899,275

(22) Filed: Oct. 6, 2010

(65) Prior Publication Data

US 2011/0109920 A1 May 12, 2011

(30) Foreign Application Priority Data

Nov. 10, 2009 (JP) ................................ 2009-257549

(51) Int. Cl.

*G06K 15/00* (2006.01)
*G06K 15/02* (2006.01)
*G06K 15/10* (2006.01)
*H04N 1/60* (2006.01)
*G03G 15/00* (2006.01)

(52) U.S. Cl.

CPC ........ *G03G 15/5008* (2013.01); *G03G 15/5041* (2013.01)

USPC ............. 358/1.5; 358/1.16; 358/1.2; 358/1.9

(58) Field of Classification Search

USPC .......... 358/1.5, 1.16, 1.2, 3.28, 3.3, 1.9, 3.32, 358/3.1, 3.24, 3.31, 501, 452, 474, 518, 358/523; 399/45, 39, 38, 46, 16, 49, 27, 28, 399/4, 9, 67, 68, 72, 83, 389, 396, 361, 33, 399/53, 61

See application file for complete search history.

(56) References Cited

U.S. PATENT DOCUMENTS 6,418,281 B1 7/2002 Ohki
6,785,480 B2 * 8/2004 Toyohara et al. ............... 399/49
6,836,625 B2 12/2004 Shiratori (Continued)

FOREIGN PATENT DOCUMENTS

EP 1 388 764 A2 2/2004
JP 2000-238341 A 9/2000

(Continued)

OTHER PUBLICATIONS

Extended European Search Report issued in corresponding European Patent Application No. 10186789.3 dated Feb. 25, 2011.

(Continued)

*Primary Examiner* — Ngon Nguyen

(74) *Attorney, Agent, or Firm* — Rossi, Kimms & McDowell LLP

(57) ABSTRACT

A determination unit determines density correction characteristics to be applied to correct density characteristics based on a reading result obtained by a reading unit. A measuring unit measures a density value of the image pattern formed on the image carrier by the image forming unit at the first image forming speed by applying the density correction characteristics. A reference density value storage unit stores, as a reference density value, the density value of the image pattern measured by the measuring unit. A creation unit creates modification data to modify the density correction characteristics for a second image forming speed from a difference between a density value of an image pattern formed on the image carrier by the image forming unit at the second image forming speed by applying the density correction characteristics, and the reference density value stored in the reference density value storage unit.

15 Claims, 8 Drawing Sheets

(56) References Cited

U.S. PATENT DOCUMENTS

| | | | | |
|---|---|---|---|---|
| 2002/0025179 | A1 | 2/2002 | Toyohara et al. | |
| 2004/0028421 | A1 | 2/2004 | Shiratori | |
| 2008/0212826 | A1 * | 9/2008 | Tanaka et al. | 382/100 |

FOREIGN PATENT DOCUMENTS

| | | | |
|---|---|---|---|
| JP | 2004069947 | A | 3/2004 |
| JP | 2004184509 | A | 7/2004 |
| JP | 2009230135 | A | 10/2009 |

OTHER PUBLICATIONS

Chinese Office Action issued in Chinese counterpart application No. CN201010542959.X, dated Feb. 1, 2013. English translation provided.

Japanese Office Action cited in Japanese counterpart application No. JP2009-257549, dated Aug. 2, 2013.

* cited by examiner

CALIBRATION METHOD EXECUTED IN IMAGE FORMING APPARATUS

BACKGROUND OF THE INVENTION

1. Field of the Invention

The present invention relates to a calibration method executed in an image forming apparatus.

2. Description of the Related Art

In general, an electrophotographic image forming apparatus requires calibration for adjusting the characteristics of an image to be formed into desired characteristics (Japanese Patent Laid-Open No. 2000-238341 (corresponding to U.S. Pat. No. 6,418,281)). Japanese Patent Laid-Open No. 2000-238341 describes a mechanism of creating a lookup table (LUT) used to perform density correction and gradation correction by reading an image pattern formed on a recording medium. Next, a reference density value is determined by measuring the density of a toner image formed on a photosensitive drum in accordance with the LUT. Lastly, the LUT is corrected by comparing the density value of a toner image formed again on the photosensitive drum at a predetermined timing with the reference density value. This makes it possible to maintain desired image density characteristics over a long period of time.

Japanese Patent Laid-Open No. 2000-238341 also brings about an effect of reducing the user's trouble and the number of recording media used, by executing a process of correcting the LUT more frequently than a process of creating an LUT using a recording medium. Hence, the invention disclosed in this patent reference is very excellent.

In recent years, the market demands that an image forming apparatus not only should achieve a faster operation and a performance for conserving more energy but also should cope with a variety of recording media from one with a small grammage to one with a large grammage. To cope with a wide range of grammages with limited power, the image forming speed (to be referred to as the process speed hereinafter) need only be changed for each type of recording medium. More specifically, a recording medium with a larger grammage need only be processed at a lower speed.

On the other hand, with a rising process speed, the difference between a maximum process speed and a minimum process speed is increasing. For example, the difference between a constant speed of 150 mm/s and its half speed is as low as 75 mm/s, but that between a constant speed of 300 mm/s and its half speed is as high as 150 mm/s. The difference in process speed varies by, for example, the dark decaying of the photosensitive body, the development efficiency, and the transfer efficiency, resulting in generation of a difference in gradation between different process speeds. It has been found that with such an increased speed difference, the use of a common LUT among a plurality of different process speeds generates a considerable difference between images formed at these process speeds. Under the circumstance, it is possible to adopt the invention described in Japanese Patent Laid-Open No. 2000-238341. Unfortunately, in this case, the user's trouble and the process time increase in proportion to the number of process speeds.

SUMMARY OF THE INVENTION

It is a feature of the present invention to reduce the user's trouble and process time associated with gradation correction in, for example, an image forming apparatus which forms images using different image forming speeds in accordance with the type of recording medium.

The present invention provides an image forming apparatus which can be utilized by switching a plurality of image forming speeds comprising the following elements. An image forming unit forms a density measuring image pattern on an image carrier at a first image forming speed. A transfer unit transfers the image pattern onto a recording medium at the first image forming speed to form a density measuring image on the recording medium. A reading unit reads the density measuring image formed on the recording medium. A determination unit determines density correction characteristics to be applied to correct density characteristics of the image forming unit and the transfer unit, based on the reading result obtained by the reading unit. A holding unit holds the density correction characteristics determined by the determination unit. A measuring unit measures a density value of the image pattern formed on the image carrier by the image forming unit at the first image forming speed by applying the density correction characteristics. A reference density value storage unit stores, as a reference density value, the density value of the image pattern measured by the measuring unit. A creation unit creates modification data to modify the density correction characteristics for a second image forming speed from a difference between a density value of an image pattern formed on the image carrier by the image forming unit at the second image forming speed by applying the density correction characteristics, and the reference density value stored in the reference density value storage unit.

Further features of the present invention will become apparent from the following description of exemplary embodiments with reference to the attached drawings.

DESCRIPTION OF THE EMBODIMENTS

Embodiments of the present invention will be shown below. Individual embodiments to be described hereinafter will serve for understanding of various kinds of concepts such as the upper concept, middle concept, and lower concept of the present invention. Also, the technical scope of the present invention is determined by the scope of the appended claims, and is not limited by the following individual embodiments.

First Embodiment

An example in which the present invention is applied to an electrophotographic color (multicolor) copying machine including a plurality of photosensitive drums will be explained in this embodiment. However, an image forming apparatus according to the present invention is also applicable to a monochrome (single-color) image forming apparatus. Moreover, the image forming apparatus according to the present invention may be a multi-function peripheral or a combination of a host computer, an image reading device, and a printer. The image forming scheme is not limited to the electrophotographic scheme, either, and the present invention is similarly applicable to any image forming scheme which requires gradation correction with time.

Figure 1:
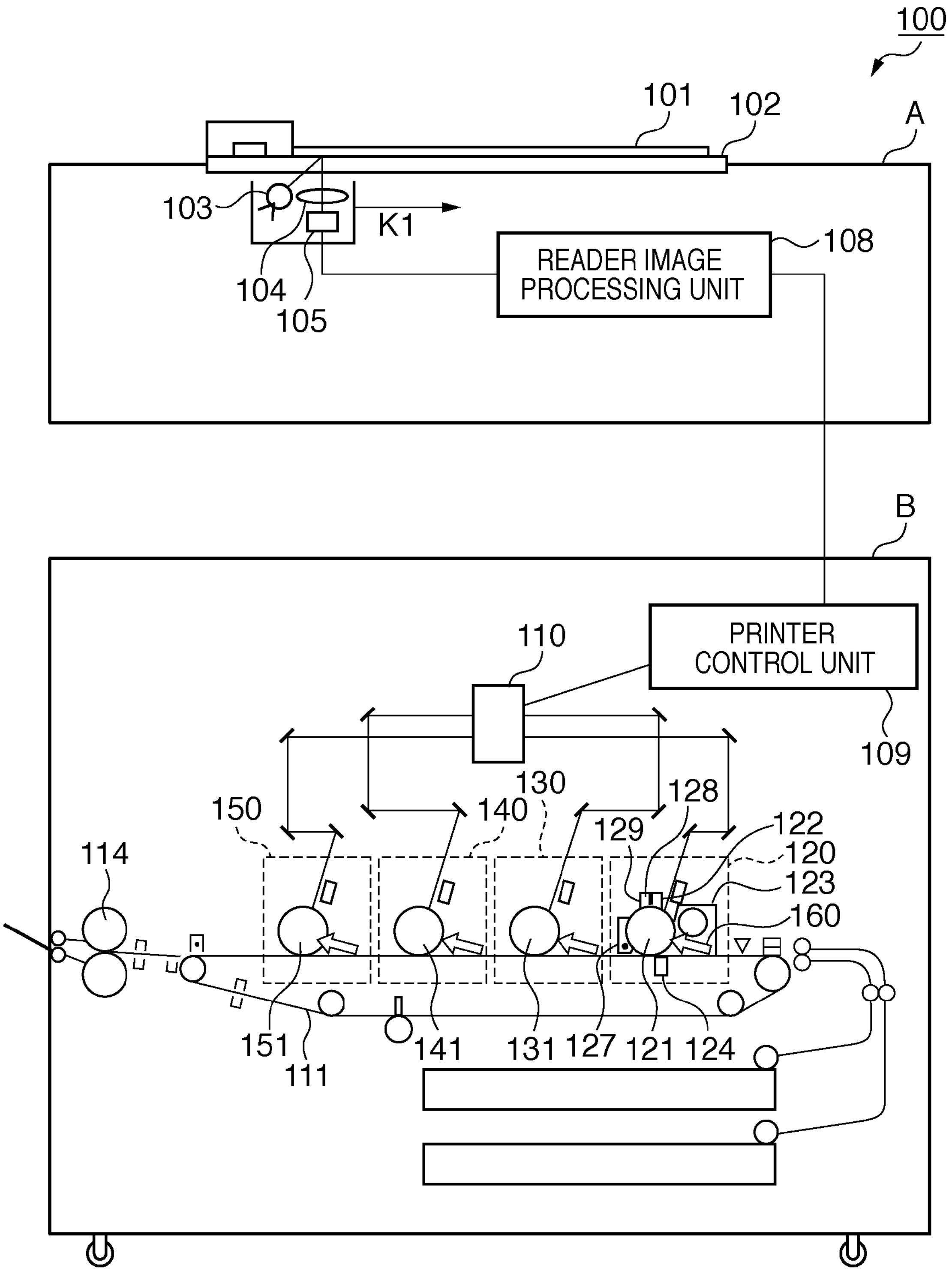
FIG. 1 is a schematic view showing the arrangement of a color copying machine in an embodiment.

A color copying machine 100 shown in FIG. 1 exemplifies an image forming apparatus which can be utilized by switching a plurality of image forming speeds. The color copying machine 100 is roughly divided into an image reading unit (to be referred to as a reader unit A hereinafter) and an image forming unit (to be referred to as a printer unit B hereinafter). A document 101 is placed on a document glass platen 102 of the reader unit A, and irradiated with illumination light by a light source 103. The light reflected by the document 101 forms an image on a CCD sensor 105 via an optical system 104. A reading optical system unit including these components scans in a direction indicated by an arrow K1 to convert an image on the document 101 into an electrical signal data stream (image signal) for each line. The image signal obtained by the CCD sensor 105 is appropriately processed by a reader image processing unit 108, and sent to a printer control unit 109 of the printer unit B.

The printer control unit 109 performs pulse-width modulation (PWM) of the image signal, and generates and outputs a laser output signal. An exposure unit 110 outputs a laser beam corresponding to the laser output signal. Next, the exposure unit 110 scans the laser beam to irradiate photosensitive drums 121, 131, 141, and 151 of image forming units 120, 130, 140, and 150, respectively. The image forming units 120, 130, 140, and 150 correspond to yellow (Y), magenta (M), cyan (C), and black (Bk), respectively. The image forming units 120 to 150 have almost the same arrangement, and the image forming unit 120 for Y will be described below.

The photosensitive drum 121 typifies an image carrier, and an electrostatic latent image is formed on its surface by a laser beam. A primary charger 122 makes preparations to form an electrostatic latent image by charging the surface of the photosensitive drum 121 to have a predetermined potential. A developer 123 develops the electrostatic latent image on the photosensitive drum 121 to form a toner image. In this manner, the exposure unit 110 and developer 123 exemplify an image forming unit that forms a density measuring image pattern on an image carrier at a set image forming speed. A transfer blade 124 transfers the toner image on the photosensitive drum 121 onto a recording medium on a transfer belt 111 by discharging electricity from the back surface of the transfer belt 111. The transfer blade 124 exemplifies a transfer unit that transfers the image pattern onto a recording medium at a designated image forming speed to form a density measuring image on the recording medium. In place of the transfer blade 124, a transfer roller may be adopted. The photosensitive drum 121 after the transfer has its surface cleaned by a cleaner 127, its electricity removed by an auxiliary charger 128, and its residual charge eliminated by a pre-exposure lamp 129. Toner images of respective colors are sequentially transferred onto the recording medium, and ultimately fixed on the recording medium by a fixer 114. A photosensor 160 is provided in each image forming unit, and used to measure the density of a toner image.

Figure 2:
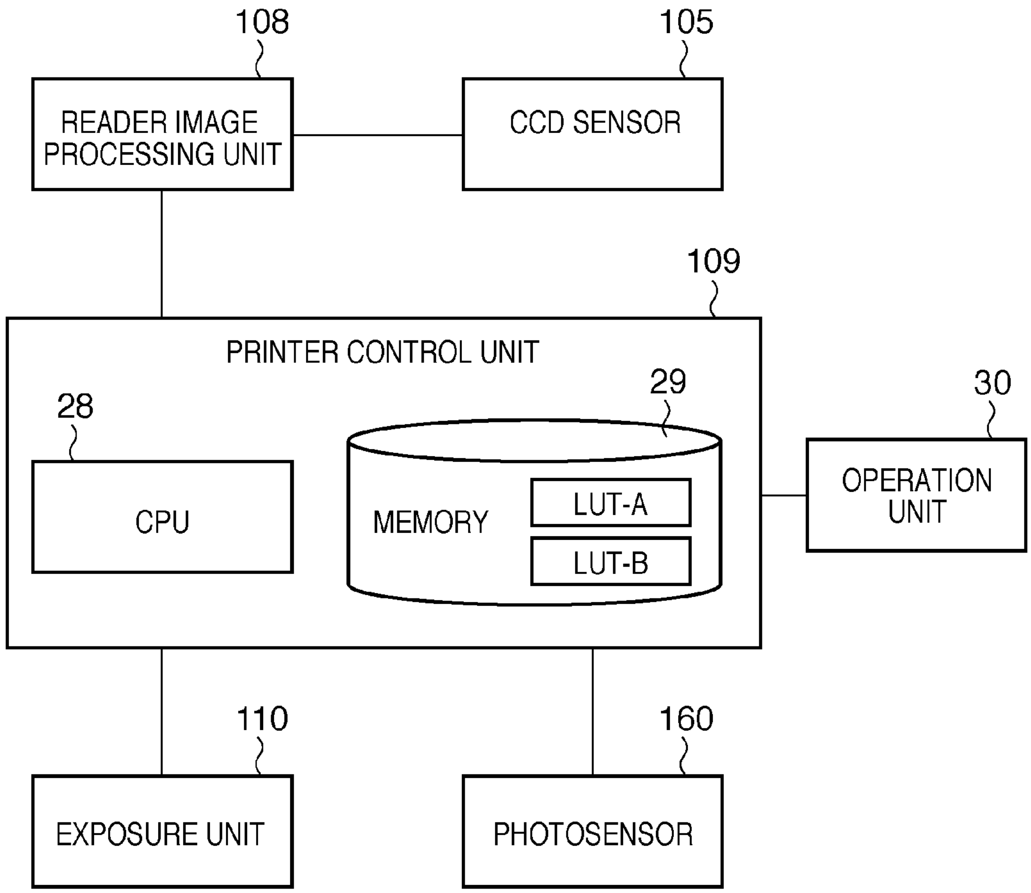
FIG. 2 is a block diagram showing a control mechanism of an image forming apparatus.

FIG. 2 is a block diagram showing a control mechanism of the image forming apparatus. The reader image processing unit 108 A/D-converts a signal from the CCD sensor 105, performs, for example, gamma correction, a color process, and MTF correction of the obtained signal, and generates and outputs an image signal. A CPU 28 of the printer control unit 109 performs, for example, a color process and gamma correction for the input image signal, and generates and outputs a laser output signal to the exposure unit 110. Note that the CPU 28 also plays the main role in a calibration process for density characteristics (gradation characteristics). A lookup table (density correction characteristics) created by the calibration is used to change the gamma characteristics of the output from the printer unit B. The exposure unit 110 includes a laser driver and semiconductor laser. The laser driver causes the semiconductor laser to emit light in accordance with a PWM signal.

Two control systems are used in the calibration of the present invention. A first control system requires a relatively long execution interval and is, for example, executed in response to an instruction issued from the serviceman during the installation operation of the image forming apparatus. A second control system requires a relatively short execution interval and is, for example, executed once a day every time a predetermined number of recording media are printed upon powering on the image forming apparatus. The first control system uses the printer unit B to transfer a density measuring image pattern onto a recording medium to form the pattern on the medium, and uses the reader unit A to read the image pattern, thereby determining the density correction characteristics of the printer unit B. The density correction characteristics are held in a nonvolatile memory 29 as a lookup table LUT_A. Note that the lookup table LUT_A is used to convert an image signal (density signal) from the reader unit A into a laser output signal. Next, the first control system forms a toner image of the image pattern on the photosensitive drum by applying the lookup table LUT_A, measures the density value of the toner image using the photosensor 160, and stores this value in the memory 29. This density value is a target (reference density value). The second control system forms a toner image of the image pattern on the photosensitive drum by applying the lookup table LUT_A, measures the density value of the toner image using the photosensor 160, and creates a modification table LUT_B to modify the lookup table LUT_A from the difference between the measured density value and the reference density value. The lookup table LUT_B is used to maintain a given image density quality and gradation quality by reflecting a temporal change of the printer unit B on the lookup table LUT_A. The first control system requires a recording medium for creating the lookup table LUT_A, whereas the second control system requires no recording medium. The second control system need not cause the reader unit A to place and read a recording medium, either. Especially because the second control system is executed more frequently than the first control system, the present invention can reduce the burden on the user and the process time.

To cope with a variety of recording media such as cardboard, plain paper, and OHT sheets, the image forming speed is desirably changed in correspondence with the type of sheet. That is, the image forming speed is dropped for a recording medium on which a toner image is hard to fix, and is raised for a recording medium on which a toner image is easy to fix. The lookup table LUT_B depends on the image forming characteristics of the printer unit B, and is therefore desirably prepared for each image forming speed. However, the calibration process time increases in proportion to the number of types of recording media when the first control system and second control system are executed for each image forming speed. To prevent this, this embodiment proposes an image forming apparatus designed such that the process time does not simply increase in proportion to the number of types of recording media regardless of an increase in number of types of recording media.

Figure 3:
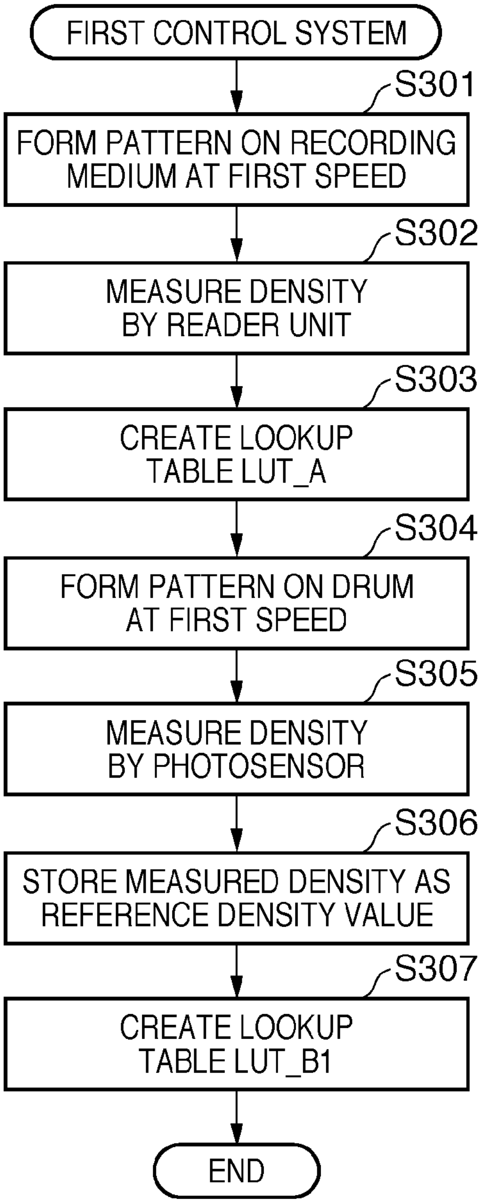
FIG. 3 is a flowchart showing a first control system according to the first embodiment.

FIG. 3 is a flowchart showing the first control system according to the first embodiment. In step S301, the CPU 28 sets the image forming speed to a first speed, generates a laser output signal for a density measuring image pattern, and outputs this signal to the exposure unit 110. The exposure unit 110 forms a latent image of the image pattern on the photosensitive drum in accordance with the laser output signal. The latent image formed on the photosensitive drum is developed into a toner image, which is transferred onto a recording medium. The fixer 114 fixes the toner image on the recording medium, and discharges this medium to the outside of the machine. This recording medium will be referred to as test print paper hereinafter. The image pattern may be formed from a gradation patch group with a total of 4 (columns)×16 (rows)=64 gray levels of colors Y, M, C, and Bk, as described in Japanese Patent Laid-Open No. 2000-238341. The reader unit A reads the test print paper on which the image pattern is printed. In step S302, the CPU 28 obtains an image signal of the image pattern on the test print paper from the reader unit A, and measures the density value at a predetermined position. For example, the CPU 28 may set 16 points as the measurement position per patch, and calculate an average of 16 density values obtained from respective measurement positions, thereby determining the obtained average as the density value of this patch.

In step S303, the CPU 28 creates a lookup table LUT_A as density correction characteristics from a correspondence between the density value measured from each patch and a laser output signal used to form this patch. For example, the lookup table LUT_A represents an inverse function to a function describing the correspondence between the density value and the laser output signal. Upon converting the density of the input image into a laser output signal using the lookup table LUT_A, the densities and gray levels of the input image and output image nearly coincide with each other. The CPU 28 and reader unit function as a reading unit and determination unit that read the image formed on the recording medium and determine density correction characteristics to be applied to correct the density characteristics of the image forming unit and transfer unit. The CPU 28 stores the created lookup table LUT_A in the memory 29. Thus, the CPU 28 functions as a holding unit that holds the density correction characteristics determined by the determination unit.

In step S304, the CPU 28 sets the image forming speed to the first speed, generates a laser output signal for a density measuring image pattern using the lookup table LUT_A, and outputs this signal to the exposure unit 110. The exposure unit 110 forms a latent image of the image pattern on the photosensitive drum in accordance with the laser output signal. The latent image formed on the photosensitive drum is developed into a toner image. However, the toner image is not transferred onto a recording medium. In step S305, the CPU 28 measures the density value of the toner image using the photosensor 160. The CPU 28 and photosensor 160 function as a measuring unit that measures the density value of the image pattern formed on the image carrier by the image forming unit at a first image forming speed by applying the density correction characteristics. In step S306, the CPU 28 stores the measured density value in the memory 29 as a reference density value. The measurement position of the photosensor 160 may be the same as that of the reader unit A. The memory 29 functions as a reference density value storage unit that stores, as a reference density value, the density value of the image pattern measured by the measuring unit. In step S307, the CPU 28 creates a lookup table LUT_B1 for the first speed from the density value measured for the first speed, and the reference density value stored in the memory 29. The CPU 28 functions as a creation unit to create modification data to modify the density correction characteristics for the first image forming speed from the difference between the density value of the image pattern formed on the image carrier by the image forming unit at the first image forming speed by applying the density correction characteristics, and the reference density value stored in the storage unit. Note that the lookup tables LUT_A and LUT_B and the reference density value are held in a nonvolatile memory. Also, the lookup table LUT_B1 determined in the first control system normally has linear characteristics as given by y=x. The reference density value obtained for the first speed is used in the second control system, and therefore continues to be held in the memory 29.

Figure 4:
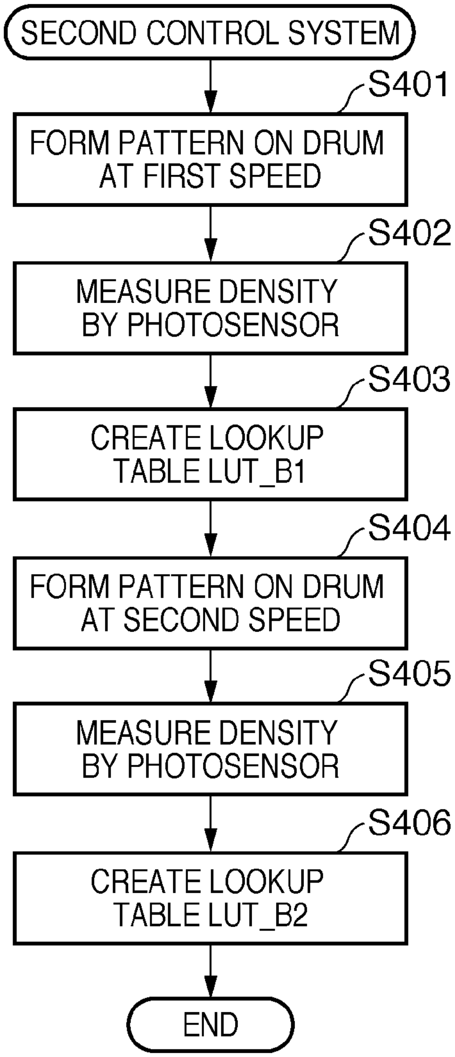
FIG. 4 is a flowchart showing a second control system according to the first embodiment.

FIG. 4 is a flowchart showing the second control system according to the first embodiment.

In step S401, the CPU 28 sets the image forming speed to the first speed, generates a laser output signal for a density measuring image pattern using the lookup table LUT_A, and outputs this signal to the exposure unit 110. The exposure unit 110 forms a latent image of the image pattern on the photosensitive drum in accordance with the laser output signal. The latent image formed on the photosensitive drum is developed into a toner image. However, the toner image is not transferred onto a recording medium.

In step S402, the CPU 28 measures the density value of the toner image using the photosensor 160.

In step S403, the CPU 28 creates a lookup table LUT_B1 for the first speed from the density value measured for the first speed, and the reference density value stored in the memory 29.

In step S404, the CPU 28 sets the image forming speed to a second speed, generates a laser output signal for a density measuring image pattern using the lookup table LUT_A, and outputs this signal to the exposure unit 110. Note that although either the first speed or the second speed may be higher, the process time can be reduced as a whole upon setting the first speed higher than the second speed. The exposure unit 110 forms a latent image of the image pattern on the photosensitive drum in accordance with the laser output signal. The latent image formed on the photosensitive drum is developed into a toner image. However, the toner image is not transferred onto a recording medium.

In step S405, the CPU 28 measures the density value of the toner image using the photosensor 160.

In step S406, the CPU 28 creates a lookup table LUT_B2 for the second speed from the density value measured for the second speed, and the reference density value stored in the memory 29. The CPU 28 functions as a creation unit that creates modification data to modify the density correction characteristics for a second image forming speed from the difference between the density value of the image pattern formed on the image carrier by the image forming unit at the second image forming speed by applying the density correction characteristics, and the reference density value stored in the storage unit.

In executing the first control system, the CPU 28 may prompt, via a display unit, the operator such as the user or the serviceman to set plain paper if plain paper is not set in a stock unit. An image pattern may be generated by the CPU 28 or by reading reference paper on which the image pattern is printed in advance.

In forming a normal image, the CPU 28 selects the lookup table LUT_B in accordance with the image forming speed. If the first speed is set as the image forming speed, the CPU 28 uses the lookup tables LUT_A and LUT_B1. In contrast, if the second speed is set as the image forming speed, the CPU 28 uses the lookup tables LUT_A and LUT_B2.

In the foregoing example, a constant speed is adopted as the first speed, and its half speed is adopted as the second speed. The process time can be reduced as a whole upon setting the first speed higher than the second speed. However, the relationship between the first speed and the second speed may be reversed to this. This is because even the latter relationship can reduce the burden on the user and the process time as compared to the prior art. Also, the number of image forming speeds is not limited to two, and may be three or more. When n image forming speeds are used, steps S404 to S406 need only be repeatedly executed for each of the second to nth speeds.

As has been described above, according to the first embodiment, the user's trouble and process time associated with gradation correction can be reduced in an image forming apparatus which forms an image using an image forming speed which differs depending on the type of recording medium. Especially when a higher image forming speed is used in the first control system, the process time is reduced as a whole. Also, in determining a reference density value in the first control system and executing the second control system, the density of a toner image formed on the image carrier is measured, so this image need not be transferred onto a recording medium. This makes it possible to reduce the number of recording media used as well. It is also possible to reduce the user's trouble and the process time, as a matter of course.

Second Embodiment

Calibration when the user has selected an arbitrary recording medium will be described in this embodiment. This embodiment assumes that an image is formed on plain paper at 300 mm/s (first speed), on cardboard 1 at 150 mm/s (second speed), and on cardboard 2 at 100 mm/s (third speed). Although three image forming speeds will be taken as an example, the present invention is also applicable to four or more image forming speeds.

Figure 5:
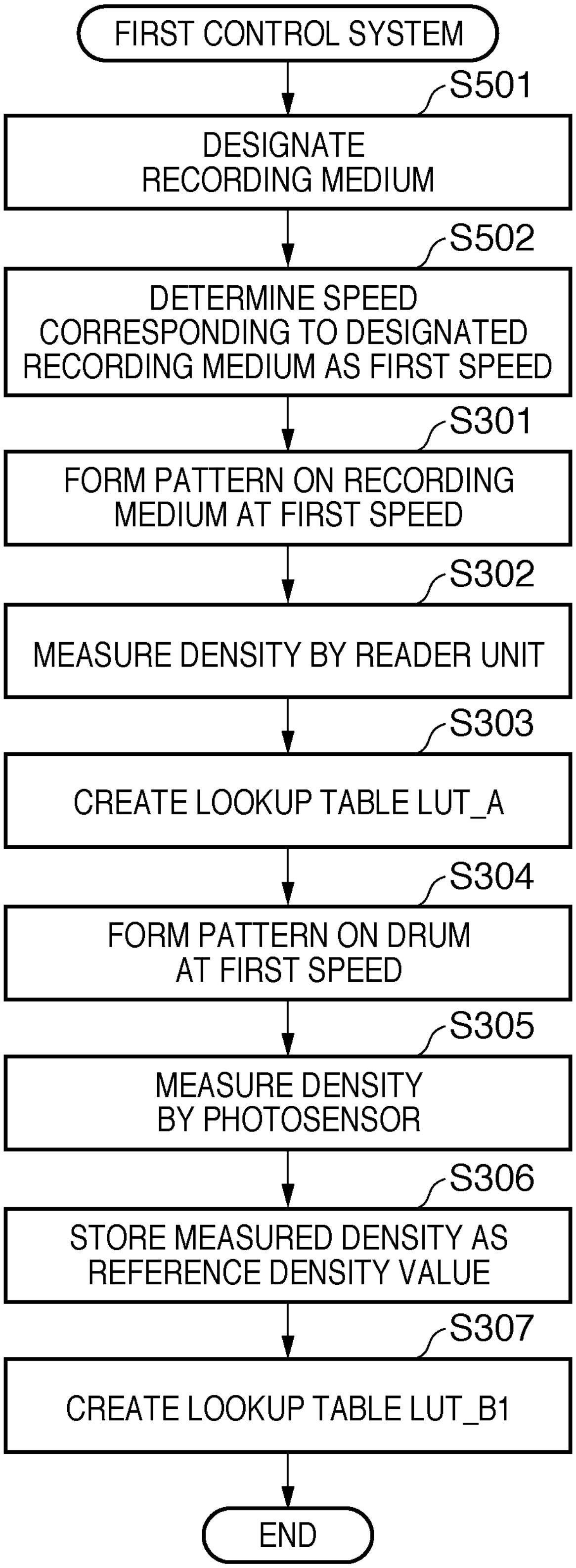
FIG. 5 is a flowchart showing a first control system according to the second embodiment.

FIG. 5 is a flowchart showing a first control system according to the second embodiment. Note that the same reference numerals denote the same portions as already described, for the sake of descriptive simplicity. In step S501, a CPU 28 designates a recording medium. A recording medium may be designated depending on, for example, the user's choice. This would be useful when the user selects a recording medium with density characteristics to which he or she wants to attach importance among a plurality of recording media, or he or she can prepare only limited types of recording media.

Figure 6:
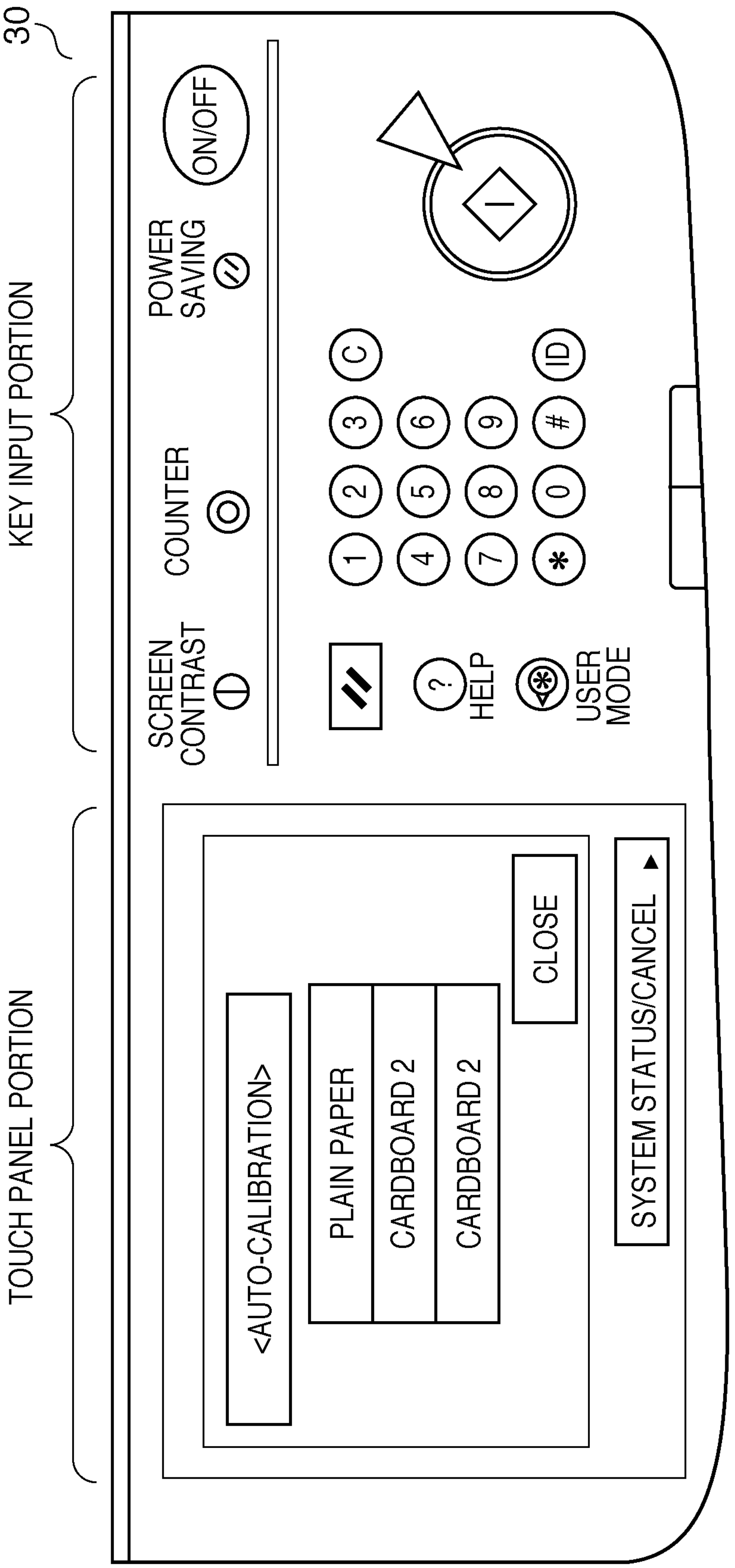
FIG. 6 is a view showing an example of an operation unit.

FIG. 6 is a view showing an example of an operation unit. Upon starting a first control system, the CPU 28 causes a display unit (touch panel unit) provided on an operation unit 30 to display a recording medium selection screen. The CPU 28 determines which recording medium has been selected in accordance with a selection instruction from the touch panel unit. The CPU 28 and operation unit 30 function as a designation unit that designates the type of recording medium.

In step S502, the CPU 28 sets an image forming speed corresponding to the designated recording medium to the first speed. In this manner, the first speed is an image forming speed corresponding to a recording medium of the type designated by the operator of an image forming apparatus. That is, the CPU 28 functions as a change unit that changes the image forming speed in accordance with the designated type of recording medium. A memory 29 tabulates and stores an image forming speed for each recording medium in advance. Hence, the CPU 28 can determine, from the table, an image forming speed corresponding to the recording medium selected by the user. Subsequently, steps S301 to S307 are executed upon setting the image forming speed corresponding to the designated recording medium as the first speed.

Figure 7:
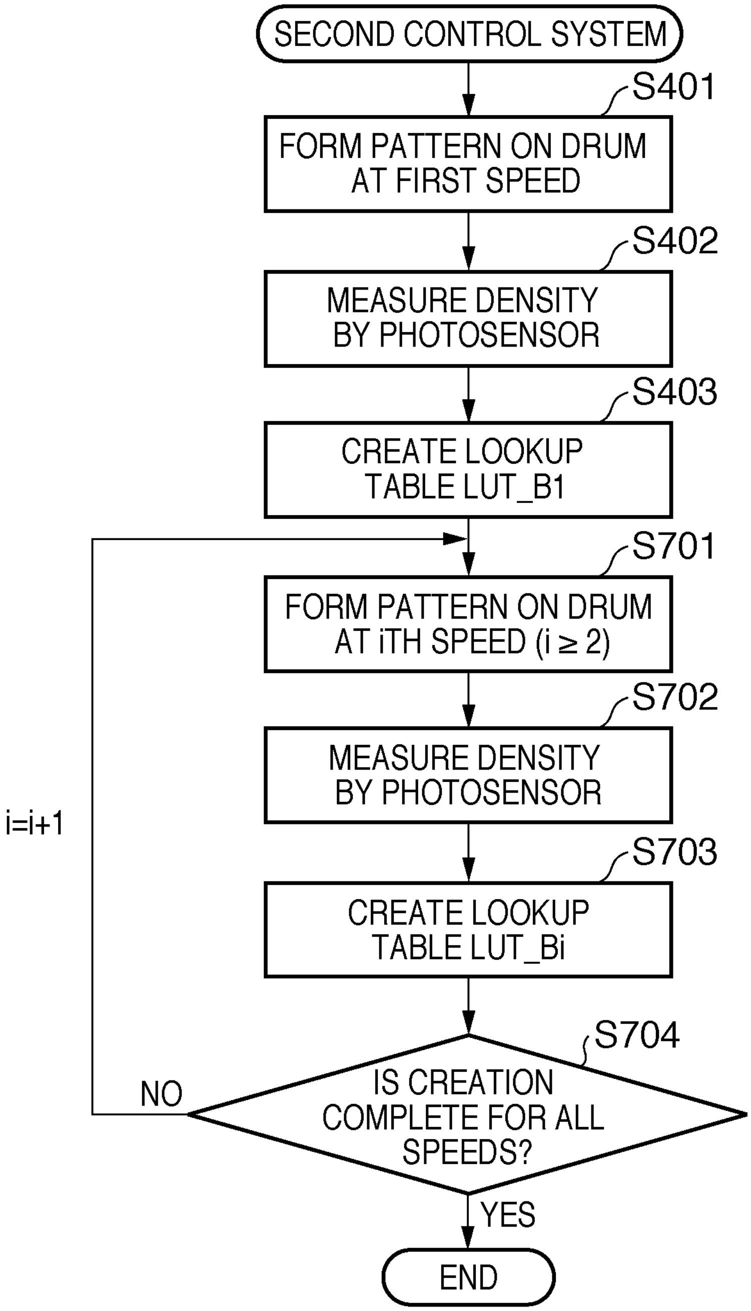
FIG. 7 is a flowchart showing a second control system according to the second embodiment.

FIG. 7 is a flowchart showing a second control system according to the second embodiment. Note that the same reference numerals denote the same portions as already described, for the sake of descriptive simplicity. When steps S401 and S402 are executed at the image forming speed corresponding to the designated recording medium, the process advances to step S701. The remaining image forming speeds that have not been designated will be referred to as the second to nth image forming speeds hereinafter.

In step S701, the CPU 28 sets the image forming speed to the ith speed, generates a laser output signal for a density measuring image pattern using a lookup table LUT_A, and outputs this signal to an exposure unit 110. The exposure unit 110 forms a latent image of the image pattern on a photosensitive drum in accordance with the laser output signal. The latent image formed on the photosensitive drum is developed into a toner image. However, the toner image is not transferred onto a recording medium. In step S702, the CPU 28 measures the density value of the toner image using a photosensor 160. In step S703, the CPU 28 creates a lookup table LUT_Bi for the ith speed from the density value measured for the ith speed, and a reference density value stored in the memory 29. In step S704, the CPU 28 checks whether creation of lookup tables LUT_B for all image forming speeds is complete. If, for example, i=n, this creation is complete for all image forming speeds. If this creation is not complete, the value i is incremented by 1 (that is, i=i+1), the process returns to step S701. In this manner, the CPU 28 creates modification data to modify the density correction characteristics for each of the second to nth image forming speeds from the difference between the density value of an image formed on the image carrier by the image forming unit at each of the second to nth image forming speeds by applying the density correction characteristics, and the reference density value stored in the reference density value storage unit.

In the foregoing way, a lookup table LUT_B corresponding to each image forming speed can be created. Since a recording medium is used in only the first control system, as in the first embodiment, the burden on the user, the process time, and the cost of recording media can be reduced in the second embodiment as well. Also, since the user can designate a recording medium ready to prepare, the user's convenience would improve.

As the differences between a plurality of image forming speeds increase, control errors may increase. This is because a reference density value is measured only for the first image forming speed. In view of this, the control errors can be reduced upon setting an image forming speed that has smallest differences from other image forming speeds as the first image forming speed. For example, assume that 300 mm/s, 150 mm/s, and 100 mm/s are used. In this case, upon setting 150 mm/s as the first image forming speed, it has differences of 150 mm/s and 50 mm/s from other image forming speeds. Upon setting 300 mm/s as the first image forming speed, it has differences of 150 mm/s and 200 mm/s from other image forming speeds. Upon setting 100 mm/s as the first image forming speed, it has differences of 200 mm/s and 50 mm/s from other image forming speeds. Hence, upon setting 150 mm/s as the first image forming speed, the differences between the image forming speeds minimize, and then the control errors are expected to minimize. The CPU 28 may determine the first image forming speed so as to minimize the speed differences by executing such speed difference calculation. In this case, the CPU 28 displays the type of recording medium corresponding to the determined, first image forming speed on the operation unit 30.

The measurement accuracy of the density of the reader unit A is about 0.05 on the scale of reflection density. On the other hand, the measurement accuracy of the photosensor 160 is about 0.10. Hence, the density can be accurately corrected by selecting, by the user, a recording medium used at a high frequency, as in this embodiment.

Third Embodiment

In the first and second embodiments, the use of a common reference density value among a plurality of image forming speeds (recording media) can realize common density (gradation) characteristics, independently of the difference in image forming speed. Nevertheless, some users may want to change the density characteristics for each recording medium. For example, one user may want to set a density higher for cardboard than for plain paper, or the density may become higher in cardboard upon fixing the toner image on it even when the amount of applied toner is decreased. In this manner, the user may want to change the density of a toner image, to be achieved on the photosensitive drum, depending on the image forming speed.

Figure 8A:
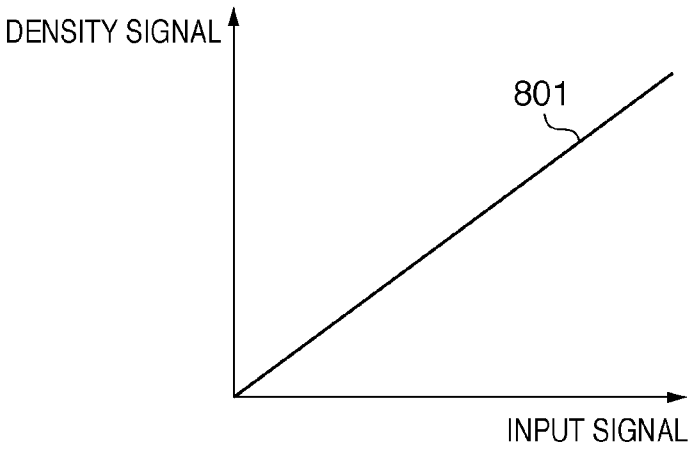
FIGS. 8A to 8C are graphs each showing a correspondence between an input signal (image signal) and a reference density value (density signal)
Figure 8B:
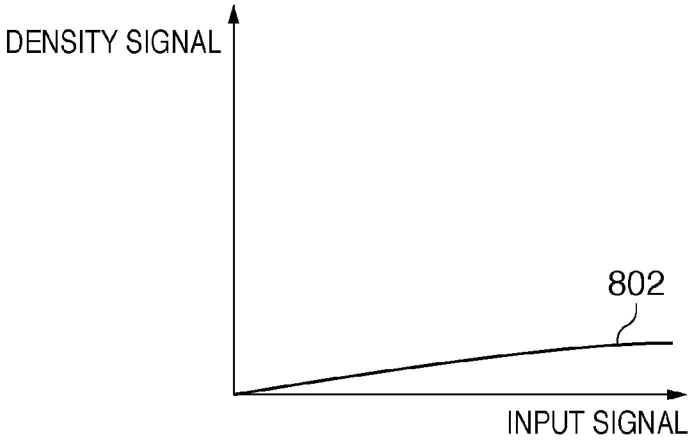
Figure 8C:
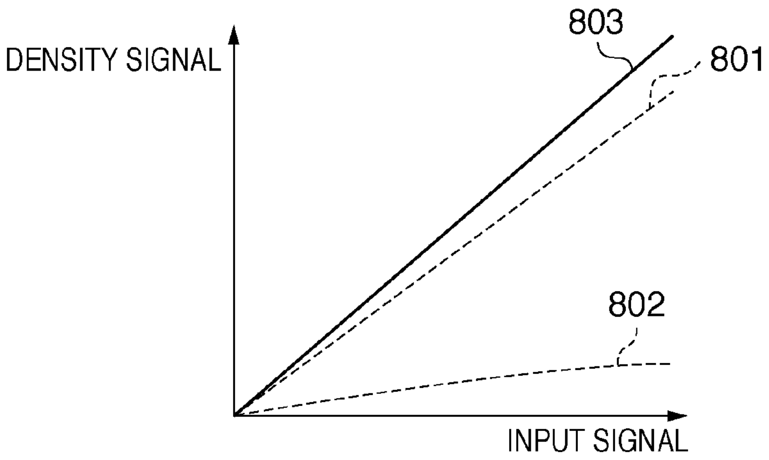

FIGS. 8A and 8B are graphs each showing a correspondence between an input signal (image signal) and a reference density value (density signal). FIG. 8A shows reference density characteristics 801 for a first speed. FIG. 8B shows difference characteristics 802 of reference density characteristics 803 for a second speed with respect to the reference density characteristics 801. The difference characteristics 802 can be interpreted as an offset. In this example, the reference density characteristics 803 for the second speed exhibit an overall density higher than the reference density characteristics 801 for the first speed. FIG. 8C shows that the reference density characteristics 803 for the second speed can be created by adding the difference characteristics 802 to the reference density characteristics 801 for the first speed. In this manner, when desired difference characteristics 802 are stored in a nonvolatile memory 29 in advance, the reference density characteristics 803 for the second speed can be created from the reference density characteristics 801 for the first speed. The memory 29 functions as an adjustment data storage unit that stores adjustment data to adjust a reference density value in advance for each of image forming speeds different from a first image forming speed.

Figure 9:
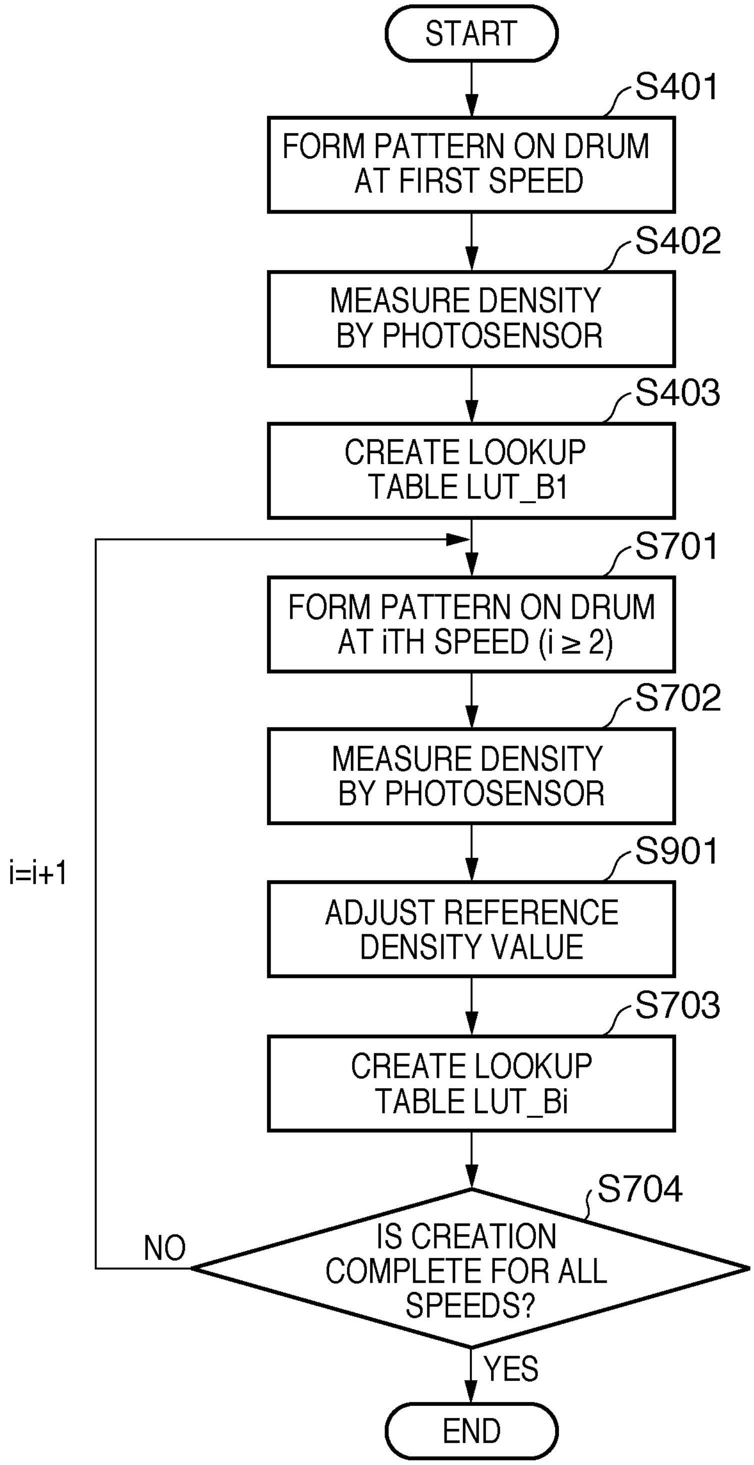
FIG. 9 is a flowchart showing a second control system according to the third embodiment.

FIG. 9 is a flowchart showing a second control system according to the third embodiment. Note that the same reference numerals denote the same portions as already described, for the sake of descriptive simplicity. As can be seen from a comparison with FIG. 7, step S901 is added between steps S702 and S703 in FIG. 9. Step S901 can also be inserted between steps S405 and S406 in FIG. 4.

In step S901, a CPU 28 reads out difference characteristics (adjustment data) stored in the memory 29 in advance for the ith image forming speed, and adds them to a reference density value obtained by applying the first image forming speed. This makes it possible to adjust the reference density value for the ith image forming speed. The CPU 28 functions as an adjusting unit that adjusts the reference density value based on the adjustment data. In step S703, a lookup table LUT_Bi as modification data is created using the adjusted, reference density value.

In this manner, according to the third embodiment, the density characteristics can be changed for each image forming speed (each type of recording medium) by adjusting a reference density value using adjustment data. The same effect can also be obtained by adjusting a created lookup table LUT_Bi using the adjustment data, instead of adjusting the reference density value. The adjustment data may be implemented using, for example, a table, a ratio, or a function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-257549 filed Nov. 10, 2009, which is hereby incorporated by reference herein in its entirety.

What is claimed is:

1. An image forming apparatus comprising:
- an image forming unit configured to form an image;
- a sensor;
- a control unit including a processor; and
- a reader unit configured to read an image formed on a recording medium;
- wherein the control unit is configured to execute:
- a converting task that converts image data based on a conversion condition;
- a first measuring task that measures a measurement image formed on a recording medium by the image forming unit based on an output from the reader unit;
- a first generation task that generates a first conversion condition for a first image forming speed based on a first measurement result of the first measuring task of a first measurement image formed at the first image forming speed;
- a second measuring task that measures a measurement image formed by the image forming unit based on an output from the sensor; and
- a second generation task that generates a second conversion condition for a second image forming speed based on the first conversion condition, a second measurement result of the second measuring task of a second measurement image formed at the first image forming speed, and a third measurement result of the second measuring task of a third measurement image formed at the second image forming speed,
- wherein the image forming unit forms the image based on the converted image data, and
- wherein the converting task converts the image data based on:
  - the first conversion condition in a case where the image forming unit forms an image at the first image forming speed, and
  - the second conversion condition in a case where the image forming unit forms an image at the second image forming speed different from the first image forming speed.

2. The apparatus according to claim 1, wherein the first image forming speed is higher than the second image forming speed.

3. The apparatus according to claim 1, wherein the control unit is further configured to execute:
- an obtaining task that obtains type information of a recording medium; and
- a determining task that determines an image forming speed corresponding to the obtained type information of the recording medium, from a plurality of image forming speeds, including the first image forming speed and the second image forming speed.

4. The apparatus according to claim 1, wherein the control unit is further configured to execute:

a correction task that corrects the first conversion condition, an imaging forming task that causes the imaging forming unit to form the second measurement image at the first image forming speed in a first timing, and form a fourth measurement image at the first image forming speed in a second timing later than the first timing, and wherein the correction task corrects the first conversion condition based on the second measurement result of the second measuring task of the second measurement image and a fourth measurement result of the second measurement task of the fourth measurement image.

5. The apparatus according to claim 1, further comprising:

an image carrier; and a transfer unit configured to transfer an image formed on the image carrier by the image forming unit to a recording medium, wherein the second measuring task measures the second measurement image and the third measurement image formed on the image carrier.

6. The apparatus according to claim 1, wherein:

the control unit is further configured to execute:

a determining task that determines a reference density corresponding to the second image forming speed based on the second measurement result of the second measuring task of the second measurement image formed at the first image forming speed, the second generating task generates the second conversion condition based on the first conversion condition generated by the first generation task, the reference density determined by the determining task corresponding to the second image forming speed, and the third measuring result of the second measuring task of the third measurement image formed at the second image forming speed.

7. The apparatus according to claim 1, wherein:

the converting task converts measurement image data based on the first conversion condition generated by the first generation task, and the image forming unit forms the second measurement image and the third measurement image based on the converted measurement image data.

8. An image forming apparatus comprising:

an image forming unit configured to form an image;

an image carrier;

a sensor;

a memory;

a control unit including a processor; and a reader unit configured to read an image formed on a recording medium;

wherein the control unit is configured to execute:

a converting task that converts image data based on a conversion condition;

a first measuring task that measures a measurement image formed on a recording medium by the image forming unit based on an output from the reader unit;

a first generation task that generates a first conversion condition for a first image forming speed based on a first measuring result of the first measuring task of a first measurement image at the first image forming speed;

a second measuring task that measures a measurement image formed on the image carrier by the image forming unit based on an output from the sensor; and a storage task that stores in the memory a reference corresponding to a second measurement result of the second measuring task of a second measurement image formed at the first image forming speed;

a second generation task that generates a second conversion condition for a second image forming speed based on the first conversion condition, a second measurement result of the second measuring task of the second measurement image formed at the first image forming speed, and a third measurement result of the second measuring task of a third measurement image formed at the second image forming speed; and an updating task that updates the first conversion condition generated by the first generation unit based on the reference stored in the storage unit and a fourth measurement result of the second measuring task of a fourth measurement image formed at the first image forming speed, wherein the image forming unit forms an image on the image carrier based on the converted image data, and transfers the image formed on the image carrier to a recording medium, wherein the converting task converts the image data based on:

the first conversion condition in a case where the image forming unit forms an image at the first image forming speed, and the second conversion condition in a case where the image forming unit forms an image at the second image forming speed.

9. An image forming apparatus comprising:

an image forming unit configured to form an image; and a first measuring device configured to measure a measurement image formed on a recording medium by the image forming unit;

a second measuring device configured to measure a measurement image formed by the image forming unit; and a control unit including a processor wherein the control unit is configured to execute:

a converting task that converts image data based on a conversion condition;

a first generation task that generates a first conversion condition for a first image forming speed based on a first measurement result of the first measuring device of a first measurement image formed at the first image forming speed; and a second generation task that generates a second conversion condition for a second image forming speed based on the first conversion condition, a second measurement result of the second measuring device of a second measurement image formed at the first image forming speed, and a third measurement result of the second measuring device of a third measurement image formed at the second image forming speed, wherein the image forming unit forms the image based on the converted image data, and wherein the converting task converts image data based on:

the first conversion condition in a case where the image forming unit forms an image at the first image forming speed, and the second conversion condition in a case where the image forming unit forms an image at the second image forming speed different from the first image forming speed.

10. The apparatus according to claim 9, wherein the first image forming speed is higher than the second image forming speed.

11. The apparatus according to claim 9, wherein the control unit is further configured to execute:

an obtaining task that obtains type information of a recording medium; and a determining task that determines an image forming speed corresponding to the obtained type information of the recording medium, from a plurality of image forming speeds, including the first image forming speed and the second image forming speed.

12. The apparatus according to claim 9, wherein:

the control unit is further configured to execute:

a correction task that corrects the first conversion condition, an imaging forming task that causes the imaging forming unit to form the second measurement image at the first image forming speed in a first timing, and form a fourth measurement image at the first image forming speed in a second timing later than the first timing, and the correction task corrects the first conversion condition based on the second measurement result of the second measuring device of the second measurement image and a fourth measurement result of the second measuring device of the fourth measurement image.

13. The apparatus according to claim 9, further comprising:

an image carrier; and a transfer unit configured to transfer an image formed on the image carrier by the image forming unit to a recording medium, wherein the second measuring device measures the second measurement image and the third measurement image formed on the image carrier.

14. The apparatus according to claim 9, wherein:

the control unit is further configured to execute:

a determining task that determines a reference density corresponding to the second image forming speed based on the second measurement result of the second measuring device of the second measurement image formed at the first image forming speed, and the second generating task generates the second conversion condition based on the first conversion condition generated by the first generation task, the reference density determined by the determining task corresponding to the second image forming speed, and the third measuring result of the second measuring device of the third measurement image formed at the second image forming speed.

15. The apparatus according to claim 9, wherein:

the converting task converts measurement image data based on the first conversion condition generated by the first generation task, and the image forming unit forms the second measurement image and the third measurement image based on the converted measurement image data.

* * * * *